Jan. 14, 1936.  W. J. DE WITT  2,028,050
FISH LURE
Filed Aug. 27, 1934
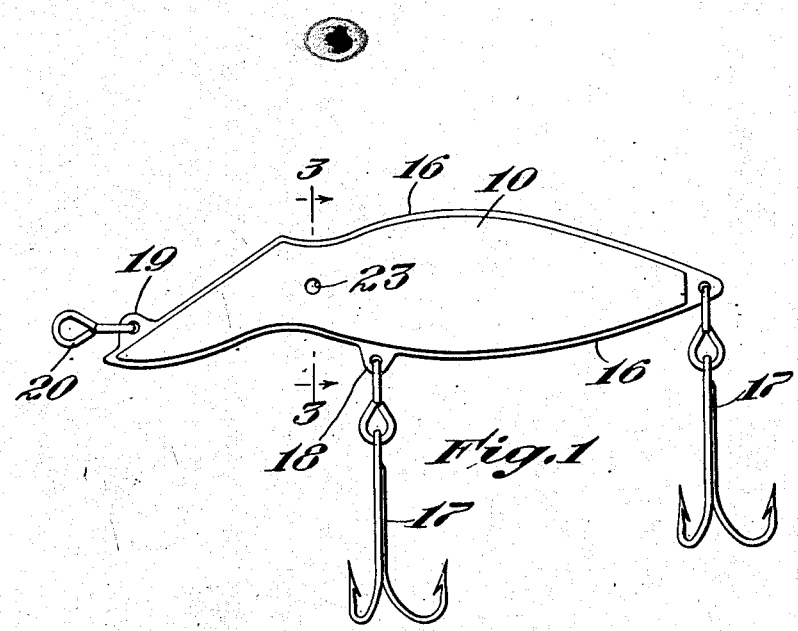
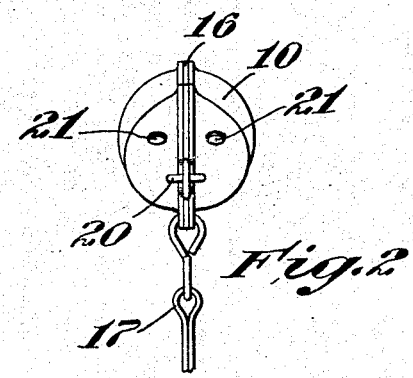
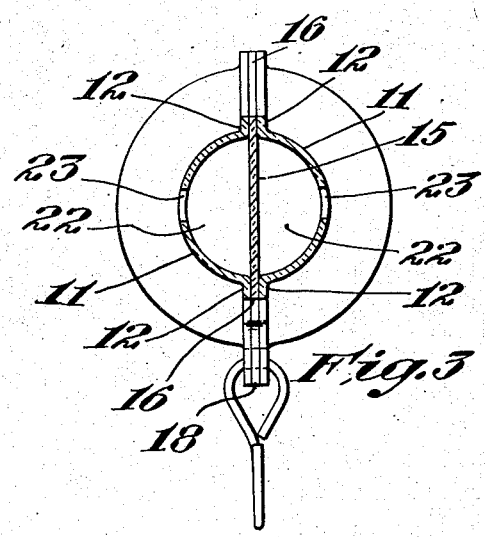
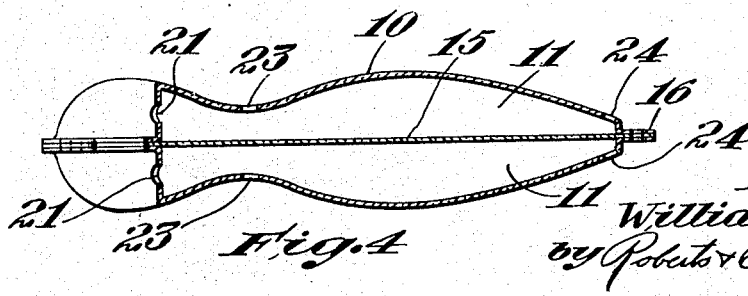
Inventor
William J. DeWitt
by Roberts & Cushman & Woodberry
Att'ys.

Patented Jan. 14, 1936

2,028,050

UNITED STATES PATENT OFFICE 2,028,050

FISH LURE

William J. De Witt, Auburn, N. Y., assignor to Shoe Form Co., Inc., Auburn, N. Y., a corporation of New York Application August 27, 1934, Serial No. 741,587

5 Claims. (Cl. 43—46)

This invention relates to an improvement in a fish lure and more particularly to one of the plug type having for its primary object the provision of a lure which will be attractive both in appearance and operation to fish and may be used either for casting or for trolling at any desired level or both as the fisherman should desire.

This and other objects will appear from a consideration of the following description and of the drawing which forms a part thereof and in which Fig. 1 is a view in side elevation of a fish lure embodying this invention;

Fig. 2 is a front elevation thereof;

Fig. 3 is an enlarged cross sectional view taken along the line 3—3 in Fig. 1; and Fig. 4 is a longitudinal section of a fish lure of the general form shown in Fig. 1 but differing therefrom in certain features which will be set forth in detail hereinbelow.

The lure comprises a hollow body 10 of celluloid or other light resilient formable material and preferably is made up of two concave-convex walls 11 provided with flanges 12. As shown in Fig. 3, the walls 11 thus define a compartment which is divided by a partition 15 extending from end to end of the lure. The edges of the partition are located between the flanges 12 forming a ridge 16 and the walls and partition are secured together in any suitable way, as by cementing, to make water tight joints. The body 10 generally simulates a fish and the lure will be described for convenience in terms suitable to its appearance.

Hooks 17 are affixed to the ridge at the tail and belly of the lure, an ear 18, formed by the flanges and partition, projecting from the ridge to receive the latter hook. At the nose of the lure is formed a similar ear 19 which receives the link 20 for the leader (not shown). The nose is flat and inclined upwardly so that as the lure is drawn through the water the latter will tend to depress the whole lure whether it be on or below the surface. The ear 19 however is located near the lower edge and consequently the drag of the leader will tend to raise the lure. The result of these coacting tendencies is a raising of the nose and a tilting downward of the tail of the lure.

In the nose of the lure is formed a pair of openings 21 one at each side of the ridge 16 which lead into the chambers 22 into which the interior compartment is divided by the partition 15. Behind the nose the lure is reduced in diameter to define what may conveniently be called a neck and in the walls 11 at the neck are formed openings 23.

It will be apparent that as the lure is drawn through the water the latter enters the openings 21 and passes out through the openings 23. While some water will remain in the chambers a considerable part will escape through the openings creating streams of bubbles which rise to the surface. These streams are of course spaced an appreciable distance apart and consequently cause a disturbance which will attract the attention of any fish nearby.

The division of the body 10 into two separate chambers 22 not only insures the formation of two separate streams of bubbles but is also of advantage in keeping the lure substantially upright since there can be no concentration of water on either side. The openings 21 and 23 also permit weighting the lure by admitting water, sand or other weight forming material into the chambers 22. The lure can thus be prepared for casting or for floating at any desired level.

Fig. 4 illustrates a lure which corresponds in structure to that previously described with the exception that it also is provided with a pair of openings 24 adjacent the tail. These openings furnish additional means of escape for the water entering through the openings 21 so that two more streams of bubbles are formed which increase the attractiveness of the lure to the fish. Furthermore any undue loading of the lure by water is prevented so that it will tend to ride in a slightly inclined position and not assume a substantially vertical position due to the weight of the tail of the lure.

While certain embodiments of this invention have been shown and described the invention is not limited thereto since other embodiments may be made without departing from the spirit and scope thereof as set forth in the following claims.

I claim:

1. A lure simulating a fish having a hollow body, and a partition dividing the internal compartment longitudinally into two chambers, and the walls of the body being provided with openings through which water enters both the chambers and escapes therefrom as the lure is drawn through the water thereby creating spaced streams of bubbles to attract the attention of any fish nearby.

2. A lure simulating a fish having a hollow body, and a partition dividing the internal compartment longitudinally into two chambers, the nose of the lure being provided with openings through which water enters both the chambers, and the walls of the lure being provided at the sides with openings through which the water entering at the first mentioned openings escapes as the lure is drawn through the water thereby creating spaced streams of bubbles to attract the attention of any fish nearby.

3. A lure simulating a fish having a hollow body, and a partition dividing the internal compartment longitudinally into two chambers, the nose of the lure being flattened and upwardly and rearwardly inclined and provided with openings through which water enters the chambers, and the walls of the lure being provided at the sides with openings through which the water entering at the first mentioned openings escapes as the lure is drawn through the water thereby creating spaced streams of bubbles to attract the attention of any fish nearby.

4. In a lure simulating a fish and having a hollow body, flanged concavo-convex walls forming said body, a partition dividing the internal compartment longitudinally into two chambers, the edges of the partition extending between the flanges of the walls and forming therewith a ridge, and hooks attached to said ridge.

5. In a lure simulating a fish and having a hollow body, flanged concavo-convex walls forming said body, and a partition dividing the internal compartment longitudinally into two chambers, the edges of the partition extending between the flanges of the walls and forming therewith a ridge, the walls being provided with openings at opposite sides of the ridge through which water enters the chambers and escapes therefrom as the lure is drawn through the water thereby creating spaced streams of bubbles to attract the attention of any fish nearby.

WILLIAM J. DE WITT.